United States Patent [19]

Kaus et al.

[11] 4,347,158

[45] Aug. 31, 1982

[54] SUPPORTED HIGH EFFICIENCY POLYOLEFIN CATALYST COMPONENT AND METHODS OF MAKING AND USING THE SAME

[75] Inventors: Malcolm J. Kaus, Mohegan Lake, N.Y.; Nemesio D. Miro, Woodridge, N.J.

[73] Assignee: Dart Industries, Inc., Los Angeles, Calif.

[21] Appl. No.: 146,341

[22] Filed: May 2, 1980

[51] Int. Cl.[3] ............... C08F 4/64; C08F 4/68; C08F 4/62

[52] U.S. Cl. ............... 252/429 B; 252/429 R; 526/125; 526/137; 526/139; 526/140; 526/141; 526/142

[58] Field of Search ............... 252/429 R, 429 B

[56] References Cited

U.S. PATENT DOCUMENTS

| | | | |
|---|---|---|---|
| 3,582,987 | 6/1971 | Natta et al. | 260/93.5 |
| 3,830,787 | 8/1974 | Susa et al. | 260/94.9 D |
| 3,888,835 | 6/1975 | Ito et al. | 260/88.2 R |
| 3,991,260 | 11/1976 | Matsuura et al. | 526/125 |
| 4,013,823 | 3/1977 | Longi et al. | 526/166 |
| 4,071,671 | 1/1978 | Kashiwa | 526/122 |
| 4,076,924 | 2/1978 | Toyota | 526/125 |
| 4,107,414 | 8/1978 | Giannini et al. | 526/114 |
| 4,111,835 | 9/1978 | Foschini et al. | 252/429 C |
| 4,143,223 | 3/1979 | Toyota et al. | 252/429 B X |
| 4,168,361 | 9/1979 | Oda et al. | 526/348.6 |
| 4,175,171 | 11/1979 | Ito et al. | 526/125 |
| 4,186,107 | 1/1980 | Wagner | 252/429 B |
| 4,211,670 | 7/1980 | Vandenberg | 252/429 B |
| 4,242,479 | 12/1980 | Yakota et al. | 252/429 B X |
| 4,243,552 | 1/1981 | Welch et al. | 252/429 B |

OTHER PUBLICATIONS

*The Condensed Chemical Dictionary*, Fifth Edition (1956), pub. by Reinhold Pub. Co., N.Y., N.Y., pp. 203 & 205.

*Primary Examiner*—Patrick Garvin
*Attorney, Agent, or Firm*—Arnold, White & Durkee

[57] ABSTRACT

A supported high efficiency catalyst component for polyolefin production and methods of making and using the same are disclosed. An enhanced support made from the materials comprising a support base, an inorganic Lewis acid and an electron donor is combined with an active transition metal compound and optionally a second electron donor to form the catalyst component. Additionally, a dehydrating agent may be precombined with the support base in the production of the catalyst support. The methods of producing such catalyst supports and catalyst components are performed by milling in the absence of any solvent. Such catalysts produce polymer of such high quality and quantity that polymer extraction and polymer deashing are not necessary.

18 Claims, No Drawings

SUPPORTED HIGH EFFICIENCY POLYOLEFIN CATALYST COMPONENT AND METHODS OF MAKING AND USING THE SAME

BACKGROUND OF THE INVENTION

The invention relates to a supported high efficiency catalyst for production of polyolefins and to the production of an enhanced support base for these catalysts.

Organometallics have been used in combination with transition metal compounds to catalyze the production of high molecular weight polymers from ethylene and alpha-olefins to produce polymers having high stereoregularity.

The basic catalysts used in these methods are formed by combining a transition metal salt with a metal alkyl or hydride. Titanium trichloride and an aluminum alkyl, such as triethyl aluminum or diethyl aluminum chloride, are often used. However, such catalysts generally have low productivity and produce polymer with low stereoregularity.

Isotactic polypropylene results from a head-to-tail linkage of the monomer units resulting in the asymmetric carbon atoms all having the same configuration. The isotactic index is a measure of the percentage of isotactic isomer in the polymer. Atactic polypropylene results from random linkage of the monomer units. Isotactic polypropylene is a highly useful commercial product having high tensile strength, hardness, stiffness, resilience, clarity and better surface luster. Polypropylene finds extensive commercial use in injection molding, film, sheeting, filament and fiber applications. Commercially useful polypropylene contains essentially the stereoregular or isotactic isomer.

For most applications, the polymer produced using these basic catalysts must be extracted to remove the atactic (non-stereoregular) polymer to increase the percentage of isotactic (stereo-regular) polymer in the final product. It is also necessary to deash polymer produced by this method to remove catalyst residues. The additional production steps of polymer extraction and polymer deashing add significantly to the cost of polymer produced with these basic catalysts.

The first improvement in these catalysts resulted from the use of mixed titanium trichloride and aluminum trichloride as the catalyst with an aluminum alkyl co-catalyst.

Later improvements centered on the supported catalysts. Many early supported catalysts were based on the reaction products of surface hydroxyl containing compounds with transition metal compounds. Examples include the reaction product of a transition metal compound with an hydroxy chloride of a bivalent metal, e.g., $Mg(OH)Cl$ (British Pat. No. 1,024,336), with $Mg(OH)_2$ (Belgian Pat. Nos. 726,832; 728,002; and 735,291), and with $SiO_2$, $Al_2O_3$, $ZrO_2$, $TiO_2$, and $MgO$ (British Pat. Nos. 969,761; 969,767; 916,132; and 1,038,882).

Some later supported catalysts were based on the reaction products of magnesium alkoxides with transition metal compounds. Examples include the reaction product of a transition metal compound with $Mg(OR)_2$ (U.S. Pat. No. 3,644,318 and Belgian Pat. Nos. 737,778; 743,325; and 780,530.)

Other supported catalysts were based on the reaction products of magnesium chloride with transition metal compounds. Titanium compounds were reacted with $MgCl_2$ (U.S. Pat. No. 3,642,746 and Belgian Pat. Nos. 755,185; 744,221; and 747,846.)

Promoted catalysts result from the addition of certain Lewis bases (electron donors) to the catalyst system. The electron donor has in certain situations been combined with titanium trichloride during production of the catalyst. Electron donors have included the ethers, esters, amines, ketones and nitroaromatics. Although the promoted catalysts improved the isotactic index of the polymer, they generally still did not produce polymer of such quality and quantity as to permit the elimination of polymer extraction and polymer deashing to remove catalyst residue.

Recently, a catalyst component with sufficiently high yield to apparently eliminate the necessity for performing polymer deashing and polymer extraction was described in U.S. Pat. No. 4,149,990. The catalyst component disclosed therein was produced by the decomposition of a magnesium halide-electron donor complex with an organoaluminum compound. However, this catalyst was produced in solution, requiring catalyst isolation and washing.

SUMMARY OF THE INVENTION

The catalyst component of the present invention overcomes many of the disadvantages of the above discussed prior art catalysts. Not only does the catalyst component of the present invention overcome those disadvantages associated with the polymerization of alpha-olefins to produce satisfactory industrial polymers, but also a polymer with superior characteristics is produced. Further, the catalyst component of the present invention exhibits superior characteristics and is produced by a method not only offering significant economic advantages, but also reducing energy consumption and pollution, over the prior art.

The present invention provides a supported high efficiency catalyst component for use in the polymerization of olefins, particularly alpha-olefins. Although the catalyst component has only been used in the production of polypropylene, it is believed that the catalyst will also produce satisfactory homopolymers or copolymers from other alpha-olefins, low molecular weight dienes and ethylene.

In order to obtain the high productivity and stereoregularity necessary for the formation of polymer with sufficiently high isotacticity and sufficiently low residue content to permit polymer use without polymer extraction or polymer deashing, it is presently believed that a supported catalyst component must be used. It is believed that a support base which is isostructural with octahedral titanium trichloride possibly permitting co-crystallization therewith, will provide the best support. Support bases having this characteristic may be selected from the inorganic and organic salts of the Group IIA and IIIA metals and of the metals of the first transition series with the exception of copper. Although many of these salts have been employed as supports, it has been found that magnesium and manganese salts are the most satisfactory. In particular, the magnesium halides appear to be the most preferred support base. Magnesium chloride is especially preferred as the support base due to the high productivity of catalyst components using magnesium chloride and the less noxious nature of its residue in the produced polymer.

An important feature of one aspect of the present invention is the co-comminution of a dehydrating agent with the support base. This feature eliminates the need to begin preparation of the catalyst with an anhydrous support base. Surprisingly, the dehydrating agent need not be removed and has no apparent effect on the catalyst performance. Calcium hydride, calcium carbide and the silicon tetrahalides are acceptable dehydrating agents, although silicon tetrachloride is the preferred agent.

In the method of this aspect of the invention a sufficient quantity of the dehydrating agent, preferably silicon tetrachloride, is co-comminuted, preferably in a ball or vibration mill, with the support base, preferably magnesium chloride, to remove sufficient water from the magnesium chloride to permit its use without affecting the activity of the catalyst. After this initial co-comminution, the resulting mixture may then be employed as a catalyst support in the production of any catalyst component normally requiring anhydrous magnesium chloride supports.

Another important feature of the present invention is the use of an inorganic Lewis acid, also preferably isostructural with octahedral titanium, in addition to the support base. This inorganic Lewis acid is preferably selected from the Group IIIA halides, phosphorus trichloride or phosphorus oxytrichloride. In the preferred method of the present invention this inorganic Lewis acid is co-comminuted with the support base and the dehydrating agent, if used. Aluminum trichloride is the presently preferred Lewis acid.

When starting with an anhydrous support base, the support base and the inorganic Lewis acid, preferably magnesium chloride and aluminum trichloride, are initially co-comminuted in a ball mill or other such mixing device. It is believed that a solid solution of formula $MgCl_2 \cdot x\ AlCl_3$ is formed.

An additional feature of the present invention is the association of a first electron donor with this support to produce an enhanced support. This electron donor may be chosen from organic compounds having at least one atom of oxygen, sulfur, nitrogen or phosphorus to function as the electron donor. The preferred electron donors are the ethers and the esters, particularly the aromatic ethers. This superior characteristic may be attributed to the presence of the pi electrons of the aromatic ring adjacent to the ether linkage. As presently understood, anisole is the most effective first electron donor. This superiority may be accounted for by the low steric hindrance of the methyl group as well as its inductive effect in addition to the previously discussed advantage of the aromatic ring. Although the exact reaction is not completely understood, it is believed that the ether linkage —O— may associate with the aluminum of the support. Whether this linkage reacts or only complexes with the aluminum is not known. See copending U.S. application Ser. No. 052,652 directed to this point and incorporated herein by reference.

The method of the present invention contemplates the initial co-comminution of the above three components to produce an enhanced support. Although it is possible to mix all three components simultaneously, it has been found that better results are achieved by the initial mixing of the support base and inorganic Lewis acid, preferably magnesium chloride and aluminum trichloride, followed by the later addition and mixing of the electron donor, preferably anisole. As stated above, a dehydrating agent, preferably silicon tetrachloride, may be pre-mixed with the support base if desired.

In addition to the enhanced support produced by the above method, the catalyst component of the present invention may contain a second electron donor. This electron donor may be chosen from the same group as that of the first electron donor, and may be the same or a different compound. However, it is believed for the same reasons given above that the ethers and esters, but particularly the aromatic esters, provide the best results. In particular, the most effective catalyst components have been produced by using ethyl benzoate as the second electron donor.

The final constituent of the catalyst component of the present invention is an active tri, tetra-, or penta-valent transition metal compound of the Group IVB-VIB metals, preferably of the formula $MO_p(OR)_m X_{n-2p-m}$. M is a Group IVB-VIB metal with valency n=3, 4 or 5. The metals titanium, vanadium, chromium and zirconium are preferred. Presently it appears that titanium is the most preferred metal due to its superior productivity. O is oxygen. p is 0 or 1. R is an alkyl, aryl, cycloalkyl group or substituted derivative thereof, where $0 \leq m \leq n$. X is any halide, i.e., chloride, bromide, iodide or flouride, although the chloride is preferred. The preferred active transition metal compound is a titanium tetrahalide, and particularly titanium tetrachloride. It is presently believed that the active transition metal, preferably tetravalent titanium, is not reduced to the trivalent state in the catalyst component. Rather, it is presently believed that this reduction takes place in situ after addition of the organometallic compound during polymerization.

The method of the present invention provides for the addition of the second electron donor, preferably ethyl benzoate, to the active support and the co-comminution thereof, preferably in a ball mill. This step is followed by the addition of the active metal compound, preferably titanium tetrachloride, to the resulting support and further co-comminution. Although it is presently believed that this step-wise addition provides a superior catalyst, it is also contemplated that the active metal compound and the second electron donor may be preformed, prior to addition of the complex to the enhanced support and co-comminution therewith.

The addition to and mixing with the enhanced support of the second electron donor, if desired, and the active transition metal compound is preferably performed in the absence of any solvent, including excess titanium tetrachloride. In fact, it is preferred to use an excess of the second electron donor, preferably ethyl benzoate, in relation to the active transition metal compound, preferably titanium tetrachloride. This preparation in the absence of a solvent permits the resulting catalyst component to be used without extraction or washing.

Alternatively, in another method of preparing the catalyst component of the present invention, the second electron donor and active transition metal compound may be added to and mixed with the enhanced support in an inert solvent or excess liquid titanium tetrachloride.

Polyolefins are produced when alpha-olefins are contacted with the catalyst component of the present invention and an organometallic co-catalyst. The preferred organometallic co-catalyst is selected from the trialkyl aluminums, the alkyl aluminum halides, and the alkyl aluminum hydrides. The most preferred co-catalyst is triethyl aluminum.

The further addition of another electron donor during polymerization increases the yield of stereoregular polymer. The electron donor may be added prior to, during or after addition of the co-catalyst or may be added as a preformed complex with the co-catalyst. The electron donor is selected from the same group as the electron donors incorporated into the catalyst component. The preferred electron donors are the aromatic esters, with methyl p-toluate especially preferred.

Polymerization using the catalyst component of the present invention may take place in liquid pool, in inert solvent, such as n-heptane, or in gas phase polymerization procedures. Essentially standard operating conditions may be used in these various polymerization methods.

The catalyst component of the present invention obtained after co-comminution of the above ingredients exhibits superior characteristics to previously known catalyst components. Such a catalyst component is a supported high efficiency catalyst component for the polymerization of alpha-olefins. Physically, the catalyst component of the present invention is less air and water reactive than previously known alpha-olefin catalyst components. Further, far less hydrogen chloride is generated during decomposition of this catalyst component. Although the catalyst component of the present invention should, like those of the prior art, be handled in an inert atmosphere in the absence of water, the fact that this catalyst component is less reactive and produces less noxious decomposition products than the catalyst components of the prior art, produces a safer catalyst component.

Prior catalyst components have required an extraction step during the catalyst component manufacturing process. The catalyst component of the present invention, which may be produced in the absence of a solvent, eliminates such a step, and thereby drastically reduces not only the capital costs for catalyst component manufacturing plants, but also the operating manufacturing costs, while still producing a highly active catalyst component. Not only are these important economic advantages achieved, but also significant reductions in energy consumption and pollution are provided.

One aspect of the catalyst component support of the present invention provides other economic advantages. By using a dehydrating agent, the use of anhydrous magnesium chloride, more costly and more difficult to handle and process, is eliminated.

The catalyst component of the present invention may also be sized in accordance with various specifications, to achieve a polymer with fewer fine size particles, i.e. 200 mesh or less. This is important to reducing waste of polypropylene from loss of the fine powders and to decreasing handling problems associated with fine powders. Variations in the milling times in the production of the catalyst component of the present invention permit the ability of achieving desired coarseness of particles of the catalyst component and thus of the produced polymer.

The catalyst of the present invention provides high productivity, yielding as high as from about 8,000 to about 11,000 pounds of polymer per pound of catalyst or from about 400,000 to about 550,000 pounds of polymer per pound of titanium. This increased productivity thereby reduces catalyst utilization. It further reduces catalyst residues in the final polypropylene product, eliminating the need for polymer deashing. The high isotacticity of the produced polymer also permits the elimination of the expensive step of polymer extraction and solvent recovery from polymer production processes using liquid monomer.

The catalyst of the present invention produces a highly stereoregular polypropylene polymer with isotactic index greater than 90, preferably 93 or higher, and of low catalyst residue, total ash less than about 700 ppm and magnesium content less than about 20 ppm. Further, the polymer size distribution is such that less than 5% of the produced polypropylene passes through a 140 mesh screen. These characteristics of the produced polymer permit the industrial use of the polymer without the expensive steps of polymer extraction and polymer deashing, resulting in significant cost savings.

Hydrogen is often used to control the molecular weight of polymers. In the method of making polypropylene, the present catalyst component produces a polymer having a desirable molecular weight distribution at lower hydrogen pressures than generally used in other manufacturing processes.

DETAILED DESCRIPTION OF THE INVENTION

The supported high efficiency catalyst component of the present invention comprises an active transition metal compound mixed with an enhanced support.

A support base selected from the group consisting of the Group IIA and IIIA salts and the salts of the multivalent metals of the first transition series forms the nucleus of the enhanced support. The magnesium and manganese salts provide what is currently believed to be the most useful support bases. The magnesium and manganese dihalides, alkyloxides, aryloxides and combinations thereof have been suggested in the art to be satisfactory. Preferred support bases are $M(OR)_nX_{2-n}$ where M is magnesium or manganese, R is alkyl or aryl, X is a halide or pseudohalide and n is 0, 1 or 2. Examples include $MgCl_2$, $MgBr_2$, $MgF_2$, $Mg(OCH_3)_2$, $Mg(OCH_2CH_3)_2$, $Mg(OC_6H_5)_2$ and combinations thereof. In the preferred embodiment the magnesium halides, particular magnesium chloride, form the support base.

Because the catalyst component is water and air reactive it is necessary to insure that the water content of the support base is sufficiently low so as not to interfere with the catalystic activity. For this reason, the magnesium chloride used as a support base should be anhydrous. Anhydrous magnesium chloride may be prepared by drying under an HCl blanket at a temperature of 350° C.

In another embodiment of the invention a dehydrating agent such as the silicon tetrahalides or calcium hydride may be added to and co-comminuted with a water containing support base prior to production of the catalyst component. The dehydrating agent becomes a part of the support base. In the preferred embodiment, silicon tetrachloride has been used as an effective dehydrating agent for this purpose. Silicon tetrachloride effectively dehydrated a water containing magnesium chloride support base and surprisingly had no apparent effect on the activity of the resulting catalyst. It is preferred that the molar ratio of dehydrating agent to water present in the support base be about one to one.

The enhanced support further comprises an inorganic Lewis acid, preferably selected from the group consisting Group IIIA halides, phosphorous trichloride and phosphorous oxytrichloride. In the preferred embodiment, aluminum trichloride comprises this Lewis acid. The preferred molar ratio of support base to Lewis acid, in the preferred embodiment, magnesium chloride to aluminum chloride, is about eight to 0.5–3.0 and especially preferred eight to 1–1.5.

The final component of the enhanced support is an electron donor. The electron donor may be selected from organic compounds containing at least one atom of oxygen, sulfur, nitrogen or phosphorus to function as the electron donor. Examples of such electron donors are ethers, esters, ketones, aldehydes, alcohols, carboxylic acids, phenols, thioethers, thioesters, thioketones, amines, amides, nitriles, isocyanates and phosphines. It is currently believed that the aromatic ethers and esters provide the most useful such electron donors. In the preferred embodiment, anisole is the electron donor. The preferred molar ratio of support base to electron donor, in the preferred embodiment of magnesium chloride to anisole, is about eight to 0.5–3.0, with about eight to 1–1.5 being especially preferred. The molar ratio of first electron donor to Lewis acid should be about one to one.

The active transition metal compound has an active tri-, tetra- or penta-valent transition metal center of a Group IVB–VIB transition element. The preferred compound has the formula $MO_p(OR)_m X_{n-2p-m}$ wherein M is the Group IVB–VIB metal with valency of $n=3$, 4 or 5, O is oxygen, p is 0 or 1, R is an alkyl, aryl, cycloalkyl group or substituted derivative thereof, X is a halide and $0 \leq m \leq n$. In practice, the transition metal is generally selected from the group consisting of titanium, vanadium, chromium and zirconium. In the preferred embodiment, the transition metal is tetra-valent titanium. The choice of a particular transition metal compound within the above formula will depend upon the reaction conditions and other constituents present in the catalyst. Some examples of active transition metal compounds which may be used are $TiCl_4$, $Ti(OCH_3)Cl_3$, $Ti(OCH_2CH_3)Cl_3$, $VCl_3$, $VOCl_2$, $VOCl_3$ and $VO(OCH_3)Cl_2$. In the preferred embodiment liquid titanium tetrachloride is used as the active transition metal compound. The preferred molar ratio of support base to active transition metal compound, in the preferred embodiment of magnesium chloride to titanium tetrachloride is about eight to 0.1–1.0, more preferably about eight to 0.4–0.6.

In an alternative preferred embodiment of the present invention a second electron donor which may be different from or the same as the first electron donor is employed. This second electron donor may be selected from the same group from which the first electron donor was selected. However, the aromatic esters are the preferred second electron donors, with ethyl benzoate being especially preferred. The preferred molar ratio of support base to second electron donor, in the preferred embodiment of magnesium chloride to ethyl benzoate is about eight to 0.5–3.0, or more preferably about eight to 0.8–1.2. The second electron donor should preferably be added in excess relative to the active transition metal compound. Most preferably, the molar ratio of second electron donor to active transition metal compound, in the preferred embodiment of ethyl benzoate to titanium tetra-chloride is about 1.6–2.4 to one. This second electron donor may be added to and mixed with the enhanced support prior to, during or after the addition of the active transition metal compound. In another embodiment this second electron donor may be precomplexed with the active transition metal compound prior to the addition of the resulting complex to the enhanced support.

The preferred method of producing the above catalyst component comprises the co-comminution of the constituents under an inert atmosphere in a ball or vibration mill. The support base is initially charged into the mill. If the support base contains water which must be removed, a sufficient quantity of dehydrating agent is initially added to the support base and the resulting mixture co-comminuted at temperatures between about 0° C. and about 90° C. for from about 15 minutes to about 48 hours. Preferably this mixing is for from about 6 hours to about 24 hours, optimally for about 15 hours, at temperatures between about 35° C. and about 50° C.

Although co-comminution may take place at temperatures between about 0° C. and about 90° C. the preferred mixing temperature is from about 35° C. to about 50° C. Mixing times may range from about 15 minutes to about 48 hours. Preferred mixing times are from about 12 hours to about 20 hours, with optimal mixing at about 16 hours. Insufficient mixing will not yield a homogeneous compound, while overmixing may cause agglomeration or may significantly decrease particle size of the catalyst component, causing a direct reduction in particle size of the polypropylene produced from the catalyst component.

In an alternative embodiment a support base containing water, the dehydrating agent and the Lewis acid are charged into the ball or vibration mill together and co-comminuted at temperatures between about 0° C. and about 90° C. for from about 15 minutes to about 48 hours. Preferably this mixing is for from about 12 hours to about 20 hours, optimally about 16 hours, at temperatures between about 35° C. and about 50° C.

A first electron donor is co-comminuted with the support base, Lewis acid and dehydrating agent if used, to produce the enhanced support. Mixing may be at temperatures between about 0° C. and about 90° C. for from about 30 minutes to about 48 hours. The preferred mixing temperatures are from about 35° C. to about 50° C. for from about one hour to about 5 hours, although co-comminution for about 3 hours is optimal.

To the enhanced support produced as described above is added the active transition metal compound. Although many transition metal compounds of the formula $MO_p(OR)_m X_{n-2p-m}$ as described above will provide satisfactory catalyst components, liquid titanium tetrachloride is the preferred active compound. Such an active transition metal compound is added to the ball or vibration mill and co-comminuted therein with the enhanced support. This mixing may be at temperatures from about 0° C. to about 90° C. and for from about 15 minutes to about 48 hours. It is preferred that this mixing take place at temperatures ranging from about 60° C. to about 80° C. and for from about 12 hours to about 20 hours, optimally for about 16 hours, to produce the supported high efficiency catalyst component.

In an alternative embodiment of the invention a second electron donor which may be different from or the same as the first electron donor may be co-comminuted with the enhanced support prior to addition of the active transition metal compound. In the preferred embodiment ethyl benzoate is co-comminuted in the ball or vibration mill with the enhanced support at temperatures from about 0° C. to about 90° C. for from about 15 minutes to about 48 hours prior to addition of titanium tetrachloride. However, the preferred mixing is at from about 35° C. to about 50° C. for from about one hour to about 5 hours, optimally about 3 hours.

In another alternative embodiment of the invention, the second electron donor, e.g., ethyl benzoate, may be premixed with the active transition metal compound, e.g., titanium tetrachloride, prior to addition of the resulting complex to the enhanced support. This complex is then mixed with the enhanced support under the conditions and for the time specified above for the active transition metal compound.

Although it is preferred that all of the above steps be performed in a ball or vibration mill or similar device in the absence of a solvent, it is also possible to prepare the catalyst component by mixing the enhanced support with the active transition metal compound and optionally the second electron donor in a solvent. Such solvents may be inert, such as n-heptane, or may be an excess of titanium tetra-chloride.

The solid catalyst component powder produced by the above method may be stored with little or no long term loss of activity. Although the resulting catalyst component is water and air reactive, its reactivity is considerably less than that of other high efficiency supported catalyst components. It is presently believed that the active transition metal, preferably tetravalent titanium, is not reduced to the trivalent state in the catalyst component. Rather, it is presently believed that this reduction takes place in situ after addition of the organometallic compound during polymerization.

The catalyst component produced by the foregoing methods is used in conjunction with a co-catalyst of an organometallic compound and optimally another organic electron donor to produce stereoregular polyolefins. The organometallic co-catalyst is selected from the group consisting of the alkyl aluminums, the alkyl aluminum halides and the alkyl aluminum hydrides. The preferred co-catalyst is triethyl aluminum, triisobutyl aluminum or diethyl aluminum chloride, with triethyl aluminum especially preferred. The molar ratio of organometallic co-catalyst to titanium containing catalyst component, preferably moles of triethyl aluminum to gram-atoms of Ti in the catalyst component of the present invention may range up to about 400 to one. In laboratory liquid pool polymerization the range of about 150–300 to one is preferred, with about 240 to one especially preferred. In continuous production processes, a range of about 30–100 to one is presently believed to be preferred. The electron donor is selected from the same group as the electron donors of the catalyst component and may be the same or different therefrom. Preferred electron donors selected from the esters of aromatic acids such as ethyl anisate, methyl p-toluate or ethyl benzoate. The most preferred electron donor is methyl p-toluate. The preferred molar ratio of organometallic co-catalyst to electron donor component, preferably moles of triethyl aluminum to moles of methyl p-toluate of the present invention is about 1.0–20.0 to one, most preferably about 2.0–3.5 to one.

A catalyst produced by the foregoing method may be used in standard methods for polymerization of alpha-olefins. The catalyst may be used in liquid pool, inert solvent or gas phase preparations. When so used, the catalyst of the present invention produces polypropylene having an isotactic index of at least 80, more preferably 90, and most preferably 93 or greater, a total ash content of not more than about 700 ppm, but more preferably as low as about 300 ppm, and a magnesium residue of less than about 20 ppm.

The preferred means of using the catalyst of the present invention is in liquid pool polymerization. When so used, in the preparation of polypropylene, the expensive steps of polymer extraction, polymer deashing and the associated solvent recovery are eliminated.

EXAMPLES

The following examples illustrating certain embodiments of the present invention are intended only to illustrate the invention and are not to be construed in any limiting sense. The polymer size distributions for polypropylene produced with the following catalysts are shown in TABLE I.

EXAMPLE 1

Anhydrous $MgCl_2$ was prepared by drying at 350° C. for 4 hours under an HCl blanket. 25 grams of this anhydrous $MgCl_2$, 4.34 grams $AlCl_3$ and 7.01 grams anisole were charged under a nitrogen atmosphere into a vibrating ball mill having a 0.6 liter capacity containing 316 stainless steel balls weighing a total of 3250 grams and having a diameter of 12 mm. This mixture was co-comminuted for 24 hours without temperature control. Titanium tetrachloride had been precomplexed with ethyl benzoate (EB) in n-heptane at about 50° C. 6.19 grams of this $TiCl_4 \cdot EB$ complex was then charged into the vibrating ball mill after the prior 24 hour co-comminution of the other materials, and the resulting mixture co-comminuted for an additional 20 hours at ambient temperature and under an inert atmosphere. This produced a solid catalyst component which could be used, without requiring extraction or catalyst washing.

A sample of the solid catalyst so prepared was tested in the liquid propylene polymerization test. 229 milligrams of the triethyl aluminum (TEAL) co-catalyst, 120 milligrams of methyl p-toluate (MPT) and 20 milligrams of the catalyst component were charged into a 1.0 liter stainless steel autoclave equipped with an agitator. Alternatively, the TEAL and MPT may be precomplexed at ambient temperature for from about 5 minutes to about 10 minutes before addition of the catalyst. The TEAL/Ti ratio was 240/1 and the TEAL/MPT ratio was 2.5. 300 Grams of liquid propylene was then charged into the reactor. Polymerization was accomplished at about 70° C. for about 1 hour. At the end of this time any unreacted propylene was flashed off and the polypropylene produced was recovered.

156 Grams of polypropylene was produced, giving a yield of 7800 grams polypropylene per gram of catalyst or 390,000 grams polypropylene per gram of titanium.

To determine the isotactic index a fraction of the polymer was extracted with boiling n-heptane for 16 hours in a Soxhlet Extractor and the n-heptane insoluble fraction dried. The isotactic index of this polymer was 86.0.

EXAMPLE 2

A catalyst, prepared according to the procedure of Example 1, was tested in the liquid propylene polymerization test as described in Example 1 with a variation in the amount of methyl p-toluate employed. In this test only 100 milligrams MPT were used, giving a TEAL/MPT ratio of 3.0. The productivity was 10,250 grams polypropylene per gram of catalyst or 512,500 grams polypropylene per gram of titanium. However, the isotactic index was only 69.0.

EXAMPLE 3

A catalyst, prepared according to the procedure of Example 1, was tested in the liquid polymerization test as described in Example 1 except that 90 milligrams of ethyl anisate were substituted for the methyl p-toluate in the liquid propylene polymerization. The TEAL/EA ratio was 4.0. The productivity of the catalyst under these conditions was only 3750 grams polypropylene per gram of catalyst or 187,500 grams polypropylene per gram of titanium with an isotactic index of 89.0.

EXAMPLE 4

A catalyst was prepared and tested using the same procedures as disclosed in Example 1 except that 5.32 grams of anisole and 4.59 grams of the $TiCl_4.EB$ complex were used. The catalyst was tested according to the method of Example 1 and showed a productivity of 5250 grams polypropylene per gram of catalyst (262,500 grams polypropylene per gram of titanium) and an isotactic index of 81.3.

EXAMPLE 5

A catalyst was prepared and tested using the same procedures as disclosed in Example 1, except that 20.0 grams $MgCl_2$, 3.50 grams $AlCl_3$, 2.84 grams anisole and 4.36 grams $TiCl_4.EB$ complex were used. The catalyst exhibited a productivity of 4400 grams polypropylene per gram of catalyst (220,000 grams polypropylene per gram of titanium) and an isotactic index of 83.2.

TABLE I

Polymer Size Distribution
(Per cent polymer on mesh screen)

| Example | 20 | 40 | 80 | 140 | Mesh 200 | 325 | Pan |
|---|---|---|---|---|---|---|---|
| 4 | 54 | 25 | 17 | 3 | 0 | 0 | 0 |
| 5 | 45 | 32 | 20 | 3 | 0 | 0 | 0 |
| 6 | 51 | 20 | 14 | 7 | 5 | 3 | 1 |
| 8 | 51 | 27 | 17 | 4 | 1 | 0 | 0 |
| 9 | 40 | 27 | 24 | 7 | 2 | 0 | 0 |
| 12 | 32 | 29 | 26 | 9 | 3 | 1 | 1 |
| 13 | 43 | 29 | 22 | 5 | 1 | 0 | 0 |
| 14 | 45 | 33 | 19 | 3 | 1 | 0 | 0 |
| 16 | 23 | 25 | 28 | 13 | 7 | 4 | 1 |
| 17 | 40 | 26 | 23 | 8 | 2 | 1 | 0 |
| 19 | 38 | 26 | 22 | 9 | 3 | 1 | 1 |
| 20 | 41 | 25 | 23 | 1 | 3 | 1 | 0 |
| 21 | 31 | 26 | 26 | 12 | 4 | 1 | 0 |
| 22 | 37 | 27 | 25 | 8 | 2 | 1 | 0 |
| 23 | 37 | 28 | 25 | 7 | 2 | 1 | 0 |
| 24 | 43 | 25 | 21 | 8 | 2 | 1 | 1 |
| 25 | 38 | 30 | 24 | 5 | 2 | 1 | 1 |
| 26 | 42 | 26 | 19 | 7 | 4 | 2 | 1 |
| 28 | 50 | 27 | 18 | 5 | 2 | 1 | 0 |
| 29 | 51 | 24 | 14 | 5 | 3 | 2 | 1 |
| 31 | 63 | 20 | 13 | 3 | 1 | 0 | 0 |
| 32 | 78 | 15 | 6 | 1 | 0 | 0 | 1 |
| 37 (7 hr) | 44 | 18 | 21 | 9 | 5 | 3 | 2 |
| 37 (10 hr) | 59 | 22 | 15 | 3 | 1 | 1 | 0 |

EXAMPLE 6

A catalyst was prepared and tested using the same procedures as disclosed in Example 1, except that 30.0 grams $MgCl_2$, 3.00 grams $AlCl_3$, 4.87 grams anisole and 6.26 grams $TiCl_4.EB$ complex were used. The catalyst exhibited a productivity of 3900 grams polypropylene per gram of catalyst (195,000 grams polypropylene per gram of titanium) and an isotactic index of 90.2.

EXAMPLE 7

A catalyst was prepared and tested using the same procedures as disclosed in Example 1, except that 20.0 grams $MgCl_2$, 1.17 grams $AlCl_3$, 2.84 grams anisole and 4.05 grams $TiCl_4.EB$ complex were used. The catalyst exhibited a productivity of 2800 grams polypropylene per gram of catalyst (140,000 grams polypropylene per gram of titanium) and an isotactic index of 85.6.

EXAMPLE 8

A catalyst was prepared by a procedure similar to that disclosed by Example 1 and tested by the procedure disclosed by Example 2. 30 grams $MgCl_2$, 5.25 grams $AlCl_3$ and 3.53 grams anisole were co-comminuted for 10 hours. 6.41 grams $TiCl_4.EB$ complex were added and co-comminution continued for 20 hours. The yield was 3900 grams polypropylene per gram of catalyst (195,000 grams polypropylene per gram of titanium) with an isotactic index of 92.4.

EXAMPLE 9

A catalyst was prepared and tested as in Example 8 except that the anhydrous $MgCl_2$ was not HCl dried and the initial milling time was 15 hours. The yield was 4800 grams polypropylene per gram of catalyst (240,000 grams polypropylene per gram of titanium) with an isotactic index of 91.9.

EXAMPLE 10

A catalyst was prepared and tested as in Example 9 except that 3.50 grams $AlCl_3$, 8.37 grams anisole, and 7.00 grams $TiCl_4.EB$ were used. The yield was only 1100 grams polypropylene per gram of catalyst (55,000 grams polypropylene per gram of titanium) with an isotactic index of 92.0.

EXAMPLE 11

A catalyst was prepared and tested as in Example 9 except that the mill was heated to about 90° C. before the addition of the $TiCl_4.EB$ complex. The yield was 4250 grams polypropylene per gram of catalyst (212,500 grams polypropylene per gram of titanium) with an isotactic index of 88.5.

EXAMPLE 12

A catalyst was prepared and tested as in Example 9 except that the final milling time was also 15 hours. The yield was 4900 grams polypropylene per gram of catalyst (245,000 grams polypropylene per gram of titanium) with an isotactic index of 92.8.

EXAMPLE 13

A catalyst was prepared and tested as in Example 12 except that 7.05 grams anisole and 7.00 grams $TiCl_4.EB$ complex were used. The yield was 4000 grams polypropylene per gram of catalyst (200,000 grams polypropylene per gram of titanium) with an isotactic index of 93.4.

EXAMPLE 14

A catalyst was prepared and tested by a procedure similar to that disclosed in Example 9 except that the final milling time was also 10 hours. 28.7 grams anhydrous $MgCl_2$, 6.52 grams $AlCl_3$, 5.28 grams anisole and 6.70 grams $TiCl_4.EB$ complex were used. The yield was 3450 grams polypropylene per gram of catalyst (172,500 grams polypropylene per gram of titanium) with an isotactic index of 94.0.

EXAMPLE 15

A catalyst was prepared and tested as in Example 14 except that 22.0 grams $MgCl_2$, 7.89 grams $AlCl_3$, 3.53 grams anisole and 5.55 grams $TiCl_4.EB$ complex were used and the mill was heated to about 90° C. before addition of the $TiCl_4.EB$. The yield was 2000 grams polypropylene per gram of catalyst (100,000 grams polypropylene per gram of titanium) with an isotactic index of 87.7.

EXAMPLE 16

Anisole and $AlCl_3$ were pre-complexed and 6.34 grams of this complex co-comminuted with 20.0 grams anhydrous $MgCl_2$ for 24 hours in the mill of Example 1. 4.36 Grams $TiCl_4.EB$ complex were added to the mill and co-comminuted for an additional 20 hours. The catalyst, when tested as in Example 1, showed a yield of 2319 grams polypropylene per gram of catalyst (115,950 grams polypropylene per gram of titanium) with an isotactic index of 92.6.

EXAMPLE 17

30.0 Grams anhydrous $MgCl_2$, 5.25 grams $AlCl_3$ and 3.53 grams anisole were co-comminuted for 15 hours as in Example 1. 3.19 Grams ethyl benzoate were added to the mill and the resulting mixture co-comminuted for an additional 10 hours. Finally, 4.00 grams $TiCl_4$ were added to the mill and co-comminution resumed for an additional 15 hours. The catalyst, tested as in Example 2, showed a yield of 3800 grams polypropylene per gram of catalyst (190,000 grams polypropylene per gram of titanium) with an isotactic index of 92.7.

EXAMPLE 18

A catalyst was prepared and tested as in Example 17 except that the final milling time was only 10 hours. The yield was 2050 grams polypropylene per gram of catalyst (102,500 grams polypropylene per gram of titanium) with an isotactic index of 92.7.

EXAMPLE 19

A catalyst was prepared and tested as in Example 17 except that 5.17 grams of ethyl benzoate were added to and co-comminuted with the enhanced support for only 5 hours, followed by addition of 3.78 grams $TiCl_4$ and co-comminution for 15 hours. The yield was 5500 grams polypropylene per gram of catalyst (275,000 grams polypropylene per gram of titanium) with an isotactic index of 92.4.

EXAMPLE 20

A catalyst was prepared and tested as in Example 19 except that the mill was heated to about 90° C. after the addition of $TiCl_4$. The yield was reduced to 3500 grams polypropylene per gram of catalyst (175,000 grams polypropylene per gram of titanium) with an isotactic index of 92.7.

EXAMPLE 21

A catalyst was prepared and tested as in Example 19 except that the co-comminution time after addition of ethyl benzoate was only 4 hours and the co-comminution time after addition of $TiCl_4$ was increased to 16 hours. The yield was only 3700 grams polypropylene per gram of catalyst (185,000 grams polypropylene per gram of titanium) with an isotactic index of 93.2.

EXAMPLE 22

A catalyst was prepared and tested as in Example 21 except that 5.89 grams ethyl benzoate and 3.83 grams $TiCl_4$ were used. The yield was 3750 grams polypropylene per gram of catalyst (187,500 grams polypropylene per gram of titanium) with an isotactic index of 94.5.

EXAMPLE 23

A catalyst was prepared and tested as in Example 19 except that the milling time after addition of ethyl benzoate was only 2 hours and the mill was heated to about 90° C. prior to addition of the ethyl benzoate. The yield was 3400 grams polypropylene per gram of catalyst (170,000 grams polypropylene per gram of titanium) with an isotactic index of 94.3.

EXAMPLE 24

A catalyst was prepared and tested as in Example 17 except that 4.58 grams anisole were used, 5.89 grams ethyl benzoate were used and co-comminuted for only 2 hours and finally 3.94 grams $TiCl_4$ were added and co-comminuted for 16 hours. The yield was 4100 grams polypropylene per gram of catalyst (205,000 grams polypropylene per gram of titanium) with an isotactic index of 93.7.

EXAMPLE 25

30.0 Grams anhydrous $MgCl_2$ and 5.25 grams $AlCl_3$ were co-comminuted for 16 hours as in Example 1. 5.89 grams ethyl benzoate were added to the mill and the resulting mixture co-comminuted for an additional 4 hours. Finally, 3.50 grams $TiCl_4$ were added to the mill and co-comminuted for an additional 15 hours. The catalyst, tested as in Example 2, showed a yield of only 1750 grams polypropylene per gram of catalyst (87,500 grams polypropylene per gram of titanium) with an isotactic index of 88.4.

EXAMPLE 26

30.0 Grams anhydrous $MgCl_2$ and 3.00 grams anisole were co-comminuted for 4 hours as in Example 1. 5.18 grams ethyl benzoate were added to the mill and the resulting mixture co-comminuted for an additional 15 hours. Finally, 3.30 grams $TiCl_4$ were added to the mill and co-comminution resumed for an additional 15 hours. The catalyst, tested as in Example 2, showed a yield of 4100 grams polypropylene per gram of catalyst (205,000 grams polypropylene per gram of titanium) with an isotactic index of 91.2.

EXAMPLE 27

30.0 Grams anhydrous $MgCl_2$ was directly co-comminuted with 5.18 grams ethyl benzoate for 15 hours as in Example 1. 3.09 Grams $TiCl_4$ was added to the mill and the resulting mixture co-comminuted for an additional 15 hours. The catalyst, when tested as in Example 2, showed a yield of only 3000 grams polypropylene per gram of catalyst (150,000 grams polypropylene per gram of titanium) with an isotactic index of 90.6.

EXAMPLE 28

30.0 Grams anhydrous $MgCl_2$ containing 6.63% $H_2O$ were co-comminuted under a nitrogen atmosphere with 7.01 grams $SiCl_4$ for 16 hours in the mill of Example 1. 5.25 grams $AlCl_3$ and 3.53 grams anisole were added to the mill and co-comminuted for an additional 15 hours. 5.17 Grams ethyl benzoate were added and co-comminuted for an additional 5 hours. Finally, 4.45 grams TiCl4 were added and co-comminuted for an additional 15 hours. The catalyst, tested as in Example 2, showed a yield of only 3600 grams polypropylene per gram of catalyst (180,000 grams polypropylene per gram of titanium) with an isotactic index of 91.1.

EXAMPLE 29

A catalyst was prepared and tested as in Example 28 except that the initial milling time was only 15 hours and the milling time following addition of ethyl benzoate was only 3 hours. The yield was reduced to 1850 grams polypropylene per gram of catalyst (92,500 grams polypropylene per gram of titanium) with an isotactic index of 90.5.

EXAMPLE 30

A catalyst was prepared and tested as in Example 28 except that 14.03 grams $SiCl_4$ was used and the milling times were respectively, 18 hours, 17 hours, 2 hours and 15 hours. The yield was only 2250 grams polypropylene per gram of catalyst (112,500 grams polypropylene per gram of titanium) with an isotactic index of 90.8.

EXAMPLE 31

A catalyst was prepared and tested as in Example 28 except that the $MgCl_2$ had only a 0.35% $H_2O$ content, only 1.00 grams $SiCl_4$ were used, 3.87 grams $TiCl_4$ were used and the milling times were respective, 4 hours, 15 hours, 3 hours and 15 hours. The yield was 5900 grams polypropylene per gram of catalyst (295,000 grams polypropylene per gram of titanium) with an isotactic index of 94.5. Liquid pool polymerization tests using this catalyst under different hydrogen pressures added to the reactor prior to the addition of the liquid propylene to determine the effect of hydrogen pressure on productivity, isotactic index and melt flow were also conducted. The results of these tests are shown in TABLE II.

EXAMPLE 32

Anhydrous $MgCl_2$ was prepared by drying at 350° C. for 4 hours under an HCl blanket. 2500 Grams of this anhydrous $MgCl_2$ and 438 grams $AlCl_3$ were charged under a nitrogen atmosphere into a Vibratom mill having a capacity of 10.0 liters and containing 2,250 stainless steel balls weighing a total of 144 kilograms and each having a diameter of one inch. This mixture was co-comminuted for 16 hours at 35°–70° C. 294 grams anisole was added and co-comminution continued for 3 hours at 35° C. 493 Grams ethyl benzoate were added and co-comminuted for an additional 3 hours at 35° C. Finally, 320 grams $TiCl_4$ were added and co-comminuted for 16 hours at 62° C.

The catalyst, tested as in Example 2, showed a yield of 9588 grams polypropylene per gram of catalyst (400,000 grams polypropylene per gram of titanium) with an isotactic index of 95.6. Additional tests using hydrogen to determine the effect of hydrogen pressure on productivity, isotactic index and melt flow are shown in TABLE II. Polymer residues for several inorganics are shown in TABLE III.

TABLE II

| | | Effect of Hydrogen Pressure During Polymerization | | |
|---|---|---|---|---|
| | Hydrogen (psig) | Liquid Pool Productivity (g PP/g Cat.) | Isotactic Index (%) | Melt Flow (dg/M) |
| EXAMPLE 31 | 0 | 6000 | 94.5 | 0.4 |
| | 5 | 7500 | 93.4 | 0.7 |
| | 10 | 7250 | 92.7 | 1.8 |
| | 15 | 7200 | 92.4 | 4.2 |
| | 20 | 5500 | 92.3 | 4.0 |
| | 25 | 5900 | 91.0 | 10.4 |
| | 35 | 6200 | 90.5 | 26.6 |
| EXAMPLE 32 | 0 | 9588 | 95.6 | 0.18 |
| | 5 | 9055 | 93.9 | 1.25 |
| | 10 | 9055 | 93.3 | 3.68 |
| | 15 | 10,866 | 92.2 | 3.81 |
| | 25 | 10,866 | 92.0 | 14.58 |
| | 35 | 10,866 | 89.0 | 30.92 |

TABLE III

| | Polymer Residue for Example 32 | | | |
|---|---|---|---|---|
| Liquid Pool Productivity (g PP/g Cat.) | Total Ash (ppm) | Mg (ppm) | Ti (ppm) | Al (ppm) |
| 9055 | 590 | 18 | 3 | 220 |
| 10,866 | 642 | 15 | 2 | 310 |
| 10,866 | 465 | 15 | 3 | 245 |
| 10,866 | 630 | 15 | 3 | 325 |

EXAMPLE 33

A sample of the solid catalyst component prepared according to the procedure of Example 32, was tested in the high pressure heptane polymerization test. 500 Milliliters of heptane was charged into a 1.0 liter stainless steel autoclave equipped with an agitator. 290 milligrams of triethyl aluminum (TEAL) was introduced and after stirring at 20° C. for 3 minutes, 120 milligrams of methyl-p-toluate (MPT) was introduced and stirred therewith at 20° C. for 3 minutes. 20 milligrams of the catalyst component prepared according to the procedure of Example 32 was then added. 81 milliliters of hydrogen at STP and propylene (150 psig) were then added and the temperature raised to 70° C. Polymerization was accomplished at 70° C. for about 2 hours. At the end of this time the unreacted propylene was vented and the polypropylene produced was recovered by filtration. The amount of polymer soluble in the polymerization solvent was determined by evaporation of an aliquot of the solvent. The catalyst produced 7155 grams polypropylene per gram of catalyst (357,750 grams polypropylene per gram of titanium) with an isotactic index of 93.8 and a heptane soluble of 2.7%.

In a second test, 162 milliliters of hydrogen at STP was used. The catalyst produced 6075 grams polypropylene per gram of catalyst (303,750 grams polypropylene per gram of titanium) with an isotactic index of 90.0 and a heptane soluble of 4.4%.

EXAMPLE 34

A catalyst was prepared and tested as in Example 32. 2500 grams $MgCl_2$ having a water content of 1.17%, 275 grams $SiCl_4$ and 656 grams $AlCl_3$ were charged into the mill and co-comminuted for 16 hours at 40° C. 393 grams anisole were added and co-comminution continued for 3 hours at 45° C. 494 grams ethyl benzoate were added and co-comminution continued for an additional 3 hours at 48° C. Finally, 321 grams TiCl₄ were added and the mixture co-comminuted for 16 hours at 58° C. When tested under 15 psig H₂ this catalyst produced 8000 grams polypropylene per gram of catalyst (400,000 grams polypropylene per gram of titanium) with an isotactic index of 89.9.

EXAMPLE 35

2660 Grams of MgCl₂ containing 4.98% water and 1036 grams SiCl₄ were charged under a nitrogen atmosphere into the Vibratom mill of Example 32. This mixture was co-comminuted for 21.5 hours at 35° C. 466 grams AlCl₃ was added to the mill and contents and co-comminuted for 1.0 hour at 35° C. 313 grams anisole was added and co-comminution continued for 19.5 hours at 35° C. 525 grams ethyl benzoate was added and the mixture co-comminuted for 5.0 hours at 35° C. Finally, 341 grams TiCl₄ was added and co-comminuted at 35° C. for 19.0 hours. A sample was taken and the mixture co-comminuted an additional 6.0 hours.

The catalyst of the first sampling, tested as in Example 2, showed a yield of 3650 grams polypropylene per gram of catalyst (182,500 grams polypropylene per gram of titanium) with an isotactic index of 93.4. The catalyst of the second sampling showed a yield of only 2550 grams polypropylene per gram of catalyst (127,500 grams polypropylene per gram of titanium) with an isotactic index of 94.2.

EXAMPLE 36

A catalyst was prepared and tested as in Example 35, except that the MgCl₂ contained only 1.17% water and only 185 grams SiCl₄ were used. 369 Grams AlCl₃, 249 grams anisole, 416 grams ethyl benzoate and 271 grams TiCl₄ were substituted for the quantities of Example 35.

The polymerization results were identical to those of Example 35.

EXAMPLE 37

5000 Grams of MgCl₂ containing 1.17% water and 552 grams SiCl₄ were charged under a nitrogen atmosphere into the Vibratom mill of Example 32. This mixture was co-comminuted for 16.0 hours at 28°–55° C. 875 grams AlCl₃ was added to the mill and contents and co-comminuted for 1.0 hour at 28°–55° C. 588 grams anisole was added and co-comminution continued for 3.0 hours at 53°–63° C. 986 grams ethyl benzoate was added and the mixture co-comminuted for 3.0 hours at 53°–63° C. 640 grams TiCl₄ was added and co-comminuted at 63° C. for an additional 7.0 hours, 3.0 hours, 4.0 hours and finally 3.0 hours, with a sample of catalyst component taken for testing after each time.

The catalyst was tested as in Example 2, except that 25 psig hydrogen was present in the autoclave. The productivity and isotactic index are shown in TABLE IV.

TABLE IV

| | | Liquid Pool Polymerization | | |
| | | Productivity | | |
| | TiCl₄ milling time (hrs) | (g.PP/g Cat.) | (g.PP/g Ti) | II (%) |
| --- | --- | --- | --- | --- |
| EXAMPLE 37 | 7.0 | (25 psig H₂) | 4800 | 240,000 | 90.0 |
| | 10.0 | (25 psig H₂) | 5850 | 292,500 | 91.1 |
| | 14.0 | (25 psig H₂) | 5800 | 290,000 | 90.2 |
| | 17.0 | (25 psig H₂) | 5750 | 287,500 | 91.0 |
| | 17.0 | (no H₂) | 4750 | 237,500 | 95.6 |
| EXAMPLE 38 | 7.0 | (no H₂) | 2500 | 125,000 | 96.3 |
| | 10.0 | (no H₂) | 3600 | 180,000 | 95.6 |
| | 13.0 | (no H₂) | 4250 | 212,500 | 94.1 |
| | 18.0 | (no H₂) | 4750 | 237,500 | 93.8 |
| | 23.0 | (no H₂) | 3500 | 175,000 | 94.5 |

EXAMPLE 38

A catalyst was prepared and tested as in Example 35 with the quantity of materials the same as there except that only 2500 grams MgCl₂ were used. The milling times and temperatures were changed to 5.0 hours at 35°–70° C. for the MgCl₂ and SiCl₄, 1.0 hour at 35° C. after addition of AlCl₃, 3.0 hours at 35°–70° C. after addition of anisole and 3.0 hours at 35°–70° C. after addition of ethyl benzoate. Milling after addition of TiCl₄ was at 35°–70° C. and catalyst component samples were taken after 7.0, 10.0, 13.0, 18.0 and 23.0 hours.

Polymerization test results are shown in TABLE IV.

EXAMPLE 39

2500 Grams MgCl₂ containing 0.16% water and 37 grams SiCl₄ were charged under a nitrogen atmosphere into the Vibratom mill of Example 32. This mixture was co-comminuted for 5.0 hours at 52° C. 438 grams AlCl₃ was added and co-comminuted for 1.0 hour at 60° C. 294 grams anisole was added and co-comminuted for 3.0 hours at 70° C. 494 grams ethyl benzoate was added and co-comminuted for 3.0 hours at 75° C. Finally, 323 grams TiCl₄ was added and co-comminuted at 92° C. for 18.0 hours and sampled, followed by an additional co-comminution at 32° C. for 1.0 hour.

The catalyst was tested as in Example 37. Productivity of the first sample was 4600 grams polypropylene per gram of catalyst (230,000 grams polypropylene per gram of titanium) with an isotactic index of 87.2. The second sample showed a productivity of 5100 grams polypropylene per gram of catalyst (255,000 grams polypropylene per gram of titanium) with an isotactic index of 93.9.

In view of the preceding description and examples, further modifications and alternative embodiments of the present invention should be apparent to those skilled in the art. Accordingly, the preceeding description and examples are to be construed as explanatory and illustrative only and are for the purpose of teaching and enabling those skilled in the art to practice this invention.

While the preferred embodiment is to be understood to be the best mode presently contemplated, it is by no means the only embodiment possible. It will be apparent to those skilled in the art that many modifications and changes in this specific method and composition may be made without departing from the scope and spirit of the present invention. For example, the disclosed catalyst may be suited for polymerizing olefins other than alpha-olefins. Also, supports other than magnesium chloride and active transition metal compounds other than titanium tetrachloride may become commercially feasible. It is applicant's intention in the following claims to cover such modifications and variations as fall within the true spirit and scope of the invention.

What is claimed is:

1. A method of producing a polymerization catalyst component suitable for use in the polymerization of alpha-olefins, comprising:
   (a) co-comminuting a support base, an inorganic Lewis acid and a first organic electron donor to form a catalyst component support suitable for use in alpha-olefin polymerization, said support base selected from the group consisting of the Group IIA and IIIA salts and the salts of the multivalent metals of the first transition series with the exception of copper; and
   (b) then co-comminuting said catalyst component support formed in step(a) with a polymerization-active tri-, tetra-, or penta-valent transition metal compound of a Group IVB-VIB metal.

2. A method of producing a catalyst component according to claim 1 wherein at least a portion of said organic electron donor associates with said inorganic Lewis acid to form an addition or substitution reaction product.

3. A method of producing a catalyst component according to claim 1 wherein said co-comminuting is performed in an inert atmosphere in the absence of any solvent.

4. A method of producing a catalyst component according to claim 3 wherein,
   (i) said support base is first co-comminuted with said inorganic Lewis acid; and
   (ii) said electron donor is then co-comminuted with the product of step (i) to produce said catalyst component support.

5. A method of producing a catalyst component according to claim 3, further comprising the step of co-comminuting a second organic electron donor which may be different from or the same as said first electron donor with said support prior to, during or after addition of said active transition metal compound.

6. A method of producing a catalyst component according to claim 53 wherein said active transition metal compound has been pre-complexed with a second electron donor which may be different from or the same as said first electron donor prior to co-comminution of the active transition metal compound/electron donor complex with said support.

7. A method of producing a catalyst component according to claim 5 wherein said inorganic Lewis acid is a metal salt selected from the group consisting of the Group IIIA halides, phosphorus trichloride and phosphorus oxytrichloride.

8. A method of producing a catalyst component according to claim 5 wherein said first and second electron donors are selected from the group consisting of organic compounds containing at least one atom of oxygen, sulfur, nitrogen or phosphorus to act as the electron donor.

9. A method of producing a catalyst component according to claim 5 wherein said support base is a magnesium or manganese salt.

10. A method of producing a catalyst component according to claim 7 wherein said first and second electron donors are selected from the group consisting of aromatic ethers and esters.

11. A method of producing a catalyst component according to claim 5 wherein said support base is magnesium chloride, said inorganic Lewis acid is aluminum trichloride, said first electron donor is anisole, said second electron donor is ethyl benzoate and said active transition metal compound of titanium tetrachloride.

12. A method of producing a catalyst component according to claim 5 wherein said support base is a magnesium or manganese halide, said inorganic Lewis acid is an aluminum halide, said first electron donor is an aromatic ether, said second electron donor is an aromatic ester and said active transition metal compound is a tetra-valent titanium compound.

13. A method of producing a catalyst component support comprising, in an inert atmosphere, the steps of:
   (a) co-comminuting a magnesium chloride support base and aluminum trichloride at from about 35° C. to about 50° C. for from about 0.5 hour to about 48 hours; and
   (b) co-comminuting anisole with the product formed in step (a), at from about 35° C. to about 50° C. for from about 15 minutes to about 48 hours to produce the support.

14. A method according to claim 13 of producing a catalyst component for polymerization of alpha-olefins to produce homopolymers or copolymers, further comprising, the steps of:
   (c) co-comminuting the support produced by the method of claim 39 with ethyl benzoate at from about 35° C. to about 50° C. for from about 15 minutes to about 48 hours; and
   (d) co-comminuting with the product formed in step (c) titanium tetrachloride at from about 60° C. to about 80° C. for from about 15 minutes to about 48 hours to produce a supported high efficiency catalyst.

15. A method according to claim 13 of producing a catalyst for polymerization of alpha-olefins to produce homopolymers or copolymers, further comprising, the step of:
   (c) co-comminuting the support produced by the method of claim 39 with a complex formed by mixing ethyl benzoate and titanium tetrachloride in solution at from about 60° C. to about 80° C. for from about 15 minutes to about 48 hours.

16. A polymerization catalyst component suitable for use in the polymerization of alpha-olefins, produced by the method of:
   (a) co-comminuting a support base, an inorganic Lewis acid and a first organic electron donor to form a catalyst component support suitable for use in alpha-olefin polymerization, said support base selected from the group consisting of the Group IIA and IIIA salts and the salts of the multivalent metals of the first transition series with the exception of copper; and
   (b) then co-comminuting said catalyst component support formed in step (a) with a polymerization-active tri-, tetra-, or penta-valent transition metal compound of a Group IVB-VIB metal, said catalyst component produced in an inert atmosphere and in the absence of a solvent.

17. A catalyst component according to claim 16 and further comprising the step of co-comminuting a second organic electron donor which may be different from or the same as said first electron donor with said support either prior to, during or after addition of said polymerization-active transition metal compound.

18. A catalyst component according to claim 17 wherein said support base is a magnesium or manganese halide, said inorganic Lewis acid is an aluminum halide, said first electron donor is an aromatic ether, said second electron donor is an aromatic ester and said polymerization-active transition metal compound is a tetra-valent titanium compound.

* * * * *

UNITED STATES PATENT AND TRADEMARK OFFICE
CERTIFICATE OF CORRECTION

PATENT NO. : 4,347,158
DATED : August 31, 1982
INVENTOR(S) : Malcolm Kaus et al

It is certified that error appears in the above—identified patent and that said Letters Patent is hereby corrected as shown below:

Column 6, line 43, please delete "catalystic" and insert --catalytic--.
Column 19, line 39, please delete "53" and insert --3--.
Column 19, line 68, please delete "of" and insert --is--.
Column 20, line 22, please delete "39" and insert --13--.
Column 20, line 35, please delete "39" and insert --13--.
Column 20, line 52, please delete "said cata-"
Column 20, line 53 and 54, please delete both lines.
Column 20, line 53, please insert as main paragraph --said catalyst component produced in an inert atmosphere and in the absence of a solvent.--.

Signed and Sealed this

Second Day of August 1983

[SEAL]

Attest:

GERALD J. MOSSINGHOFF

Attesting Officer

Commissioner of Patents and Trademarks